United States Patent
Park

(10) Patent No.: US 10,979,901 B2
(45) Date of Patent: *Apr. 13, 2021

(54) ELECTRONIC DEVICE AND METHOD FOR PROCESSING DATA IN ELECTRONIC DEVICE

(71) Applicant: Samsung Electronics Co., Ltd., Gyeonggi-do (KR)

(72) Inventor: Hye-Won Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

This patent is subject to a terminal disclaimer.

(21) Appl. No.: 16/143,965

(22) Filed: Sep. 27, 2018

(65) Prior Publication Data

US 2019/0028890 A1    Jan. 24, 2019

Related U.S. Application Data

(63) Continuation of application No. 14/847,407, filed on Sep. 8, 2015, now Pat. No. 10,129,741.

(30) Foreign Application Priority Data

Sep. 18, 2014    (KR) .......................... 10-2014-0124192

(51) Int. Cl.
*H04W 12/06*  (2021.01)
*H04L 9/00*  (2006.01)
(Continued)

(52) U.S. Cl.
CPC .......... *H04W 12/04* (2013.01); *H04L 9/0872* (2013.01); *H04L 63/0428* (2013.01);
(Continued)

(58) Field of Classification Search
CPC ....... H04W 12/04; H04W 4/80; H04W 12/06; H04W 12/00502; H04L 9/0872;
(Continued)

(56) References Cited

U.S. PATENT DOCUMENTS

2003/0123667 A1 * 7/2003 Weber ................... H04L 9/0866
                                                                  380/277
2005/0160138 A1    7/2005 Ishidoshiro
(Continued)

FOREIGN PATENT DOCUMENTS

| CN | 1614921 A | 5/2005 |
|---|---|---|
| CN | 101106470 A | 1/2008 |
| CN | 101933285 A | 12/2010 |
| EP | 2 662 840 A2 | 11/2013 |
| KR | 10-2006-0127754 | 12/2006 |

OTHER PUBLICATIONS

Chinese Search Report dated Oct. 9, 2019.
Korean Search Report dated Dec. 8, 2020.

*Primary Examiner* — Alexander Lagor
(74) *Attorney, Agent, or Firm* — Cha & Reiter, LLC

(57) ABSTRACT

Provided are an electronic device and a method for processing data in the electronic device. The electronic device may receive server registration time-related information—that is, information related to a time when at least one beacon device becomes registered in a server, and decrypt at least one beacon signal received from the at least one beacon device based on the received server registration time-related information.

6 Claims, 10 Drawing Sheets

(51) Int. Cl.
*H04W 12/04* (2021.01)
*H04L 29/06* (2006.01)
*H04L 9/08* (2006.01)
*H04W 4/80* (2018.01)
*H04W 12/00* (2021.01)

(52) U.S. Cl.
CPC ............. *H04L 63/068* (2013.01); *H04W 4/80* (2018.02); *H04W 12/06* (2013.01); *H04W 12/00502* (2019.01)

(58) Field of Classification Search
CPC . H04L 63/068; H04L 63/0428; H04L 63/067; H04L 67/26; H04L 9/0861; H04L 9/12; H04L 9/065
See application file for complete search history.

(56) References Cited

U.S. PATENT DOCUMENTS

| | | |
|---|---|---|
| 2009/0141900 A1 | 6/2009 | Ye et al. |
| 2009/0245516 A1* | 10/2009 | Ravikiran ............. H04L 9/0869 380/268 |
| 2013/0151857 A1 | 6/2013 | Agrawal |
| 2013/0223626 A1* | 8/2013 | Edge ....................... H04L 12/18 380/270 |
| 2013/0272134 A1 | 10/2013 | Miller et al. |
| 2015/0296347 A1* | 10/2015 | Roth ..................... H04L 9/0631 705/326 |

\* cited by examiner

ELECTRONIC DEVICE AND METHOD FOR PROCESSING DATA IN ELECTRONIC DEVICE

CROSS REFERENCE TO RELATED APPLICATIONS

This application is a Continuation of U.S. patent application Ser. No. 14/847,407 filed on Sep. 8, 2015 which claims the benefit of priority under 35 U.S.C. § 119(a) from a Korean patent application filed in the Korean Intellectual Property Office on Sep. 18, 2014 and assigned Serial No. 10-2014-0124192, the entire disclosure of which is incorporated herein by reference in its entirety.

TECHNICAL FIELD

Various embodiments of the present disclosure relate generally to an electronic device and a method for processing data in the electronic device.

BACKGROUND

Recently, electronic devices have been developed to provide many different functions. Such electronic devices contain display units in order to enable users to use the functions more effectively. For example, a recent smartphone contains a display unit (e.g., a touchscreen) with a front portion which responds to a touch.

Also, the electronic devices may contain various applications (for example, also referred to as 'apps') which a user may install or execute. A user may employ various input units (e.g., touchscreens, buttons, mouse units, keyboards, and sensors) to execute and control the applications in the electronic devices.

A communication function is one of the most widely-used functions in electronic devices. An electronic device may receive an advertisement packet from at least one external electronic device and receive a service related to the advertisement packet from a server.

The aforementioned background information is may help one understand the present disclosure. There is neither a determination nor an assertion as to whether any of the above might be applicable as prior art with regard to the present disclosure.

SUMMARY

One aspect of the present disclosure is to address at least some of the above-mentioned problems and/or disadvantages and to provide at least the advantages described below. Accordingly, one aspect of the present disclosure is to provide an electronic device and a method for processing data in the electronic device.

In order to perform short-range communication, an electronic device may broadcast an advertisement packet. Since an advertisement packet may be randomly broadcast, electronic devices that are irrelevant to an advertisement packet may receive the advertisement packet. Thus, there is a need for a method for detecting an advertisement packet only in relevant electronic devices.

According to various embodiments of the present disclosure, in a method for processing data in an electronic device, a specific electronic device (e.g., a beacon device) may encrypt and broadcast an advertisement packet based on time information—that is, information about when the specific electronic device becomes registered in a server. The electronic device may receive the time information and decrypt the advertisement packet based on the received time information.

In accordance with various embodiments of the present disclosure, a method for processing data in an electronic device may include: receiving server registration time-related information—that is, information related to a time when at least one beacon device becomes registered in a server; and decrypting at least one beacon signal received from the at least one beacon device based on the received server registration time-related information.

In accordance with various other embodiments of the present disclosure, a method for processing data in a beacon device may include: registering the beacon device in a server; determining an elapsed time from a registration time—that is, a time when the beacon device becomes registered in the server; encrypting at least one piece of data in a beacon signal based on the elapsed time; and broadcasting the beacon signal.

In accordance with various other embodiments of the present disclosure, a method for processing data in a server may include: determining server registration time-related information—that is, information related to a time when at least one beacon device becomes registered in the server; transmitting the server registration time-related information to at least one electronic device; and providing, in response to a request for a service related to a beacon signal, the requested beacon signal-related service to the electronic device requesting the service.

In accordance with various other embodiments of the present disclosure, an electronic device may include: a communication module configured to receive server registration time-related information—that is, information related to a time when at least one beacon device becomes registered in a server; and a processor configured to decrypt at least one beacon signal received from the at least one beacon device based on the received server registration time-related information.

In accordance with various other embodiments of the present disclosure, a beacon device may include: a memory configured to store information related to a registration time—that is, a time when the beacon device becomes registered in a server; and a controller configured to register the beacon device in the server, determine an elapsed time from the registration time that is the time when the beacon device becomes registered in the server, encrypt at least one piece of data in a beacon signal based on the elapsed time, and control operation of broadcasting the beacon signal.

In accordance with various other embodiments of the present disclosure, a server may include: a memory configured to store server registration time-related information—that is, information related to a time when at least one beacon device becomes registered in the server; and a controller configured to control operations of transmitting the server registration time-related information to at least one electronic device and provide, in response to a request for a service related to a beacon signal, the requested beacon signal-related service to the electronic device requesting the service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the present disclosure will become

DETAILED DESCRIPTION

Figure 1:
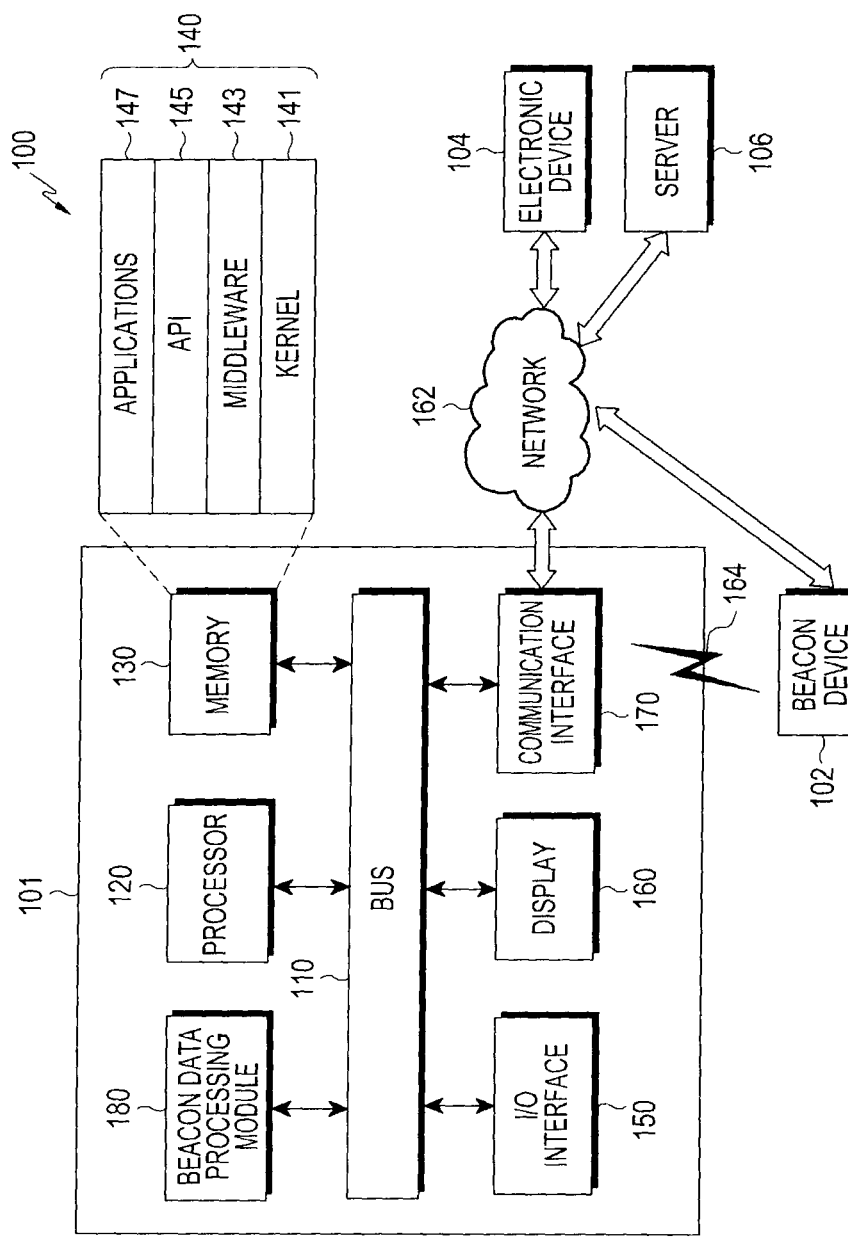
FIG. 1 is a diagram illustrating a network environment according to various embodiments of the present disclosure.

Herein is a description of various embodiments of the present disclosure with reference to the accompanying drawings. However, the present disclosure also includes various modifications, equivalents, and/or alternatives thereof. Throughout the specification and drawings, reference numerals may denote like elements or components.

Terms including "comprise," "include," and "have" specify the presence of stated features (e.g., numerical values, functions, operations, parts, elements, and components) but do not preclude the presence or addition of at least one other feature. Herein expressions "A or B," "at least one of A and/or B," and "one or more of A and/or B" may include any and all combinations of at least one of the associated listed items. For example, "A or B," "at least one of A and B," or "at least one of A or B" may denote all of the cases of (1) including at least one A, (2) including at least one B, and (3) including at least one A and at least one B.

Terms including "first" and "second" may modify various elements or components regardless of their order and/or importance, and these terms should not limit these elements or components. These terms may be useful only for distinguishing one element or component from another element or component. For example, a first user device and a second user device may refer to different user devices regardless of their order or importance. For example, without departing from the scope of the present disclosure, a first component may be referred to as a second component, and vice versa.

When a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components). When a component (e.g., a first component) is referred to as being "directly coupled to/with" or "directly connected to/with" another component (e.g., a second component), no other components (e.g., third components) exist therebetween. The expression "configured to (or set to)" used herein may be replaced with "suitable for," "having the capacity to," "designed to," "adapted to," "made to," or "capable of" according to cases. The expression "configured to (or set to)" may not necessarily mean "specifically designed to" in a hardware level. Instead, in some case, the expression "apparatus configured to . . . " may mean that the apparatus is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory device.

The terms herein describe particular embodiments and do not limit the scope of the present disclosure. The singular forms "a," "an," and "the" may include the plural forms as well, unless the context clearly indicates otherwise. Unless otherwise specified, all terms (including technical or scientific terms) herein may have the same meanings as commonly understood by those of ordinary skill in the art of the present disclosure. The terms defined in commonly-used dictionaries may be interpreted as having the same meanings as the contextual meanings of the related art and will not be interpreted in an idealized or overly-formal sense unless otherwise expressly defined herein. In some cases, even the terms herein may not exclude the embodiments of the present disclosure.

An electronic device, according to various embodiments of the present disclosure, may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Motion Picture Expert Group (MPEG) audio layer 3 (MP3) player, a mobile medical device, a camera, or a wearable device (e.g., a pair of smart glasses, a head-mounted device (HMD), an electronic garment, an electronic bracelet, an electronic necklace, an electronic application accessory (appcessory), an electronic tattoo, a smart mirror, or a smart watch).

In some embodiments, the electronic device may be a smart home appliance. The smart home appliance may include, for example, at least one of a television (TV), a digital video disk (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Goggle TV™), a game console (e.g., Xbox™ or PlayStation™), an electronic dictionary, an electronic key, a camcorder, or an electronic picture frame.

In other embodiments, the electronic device may include at least one of any type of medical device (e.g., any type of portable medical meter (such as a blood sugar meter, a heart rate meter, a blood pressure meter, or a body temperature meter), a magnetic resonance angiography (MRA) device, a magnetic resonance imaging (MRI) device, a computerized tomography (CT) device, a tomograph, or an ultrasound machine), a navigation device, a global positioning system (GPS) receiver, an event data recorder (EDR), a flight data recorder (FDR), an automotive infotainment device, an electronic ship equipment (e.g., a ship navigation device and a gyrocompass), an avionic device, a security device, a vehicle head unit, an industrial or home robot, an automatic teller machine (ATM) of a financial institution, a point-of-sale (POS) device of a store, or an Internet-of-Things (IoT) device (e.g., an electric bulb, any type of sensor, an electricity or gas meter, a sprinkler, a fire alarm, a thermostat, a street lamp, a toaster, an exercise equipment, a hot-water tank, a heater, or a boiler).

According to some embodiments, the electronic device may include at least one of a part of furniture or building/structure, an electronic board, an electronic signature receiving device, a projector, or any type of meter (e.g., a water meter, an electricity meter, a gas meter, or a radio wave meter). In various embodiments of the present disclosure, the electronic device may be any one or any combination of the above-described various devices. The electronic device according to some embodiments may be a flexible electronic device. Also, the electronic device, according to the embodiments of the present disclosure, is not limited to the above-described devices and may include new electronic devices resulting from technology development.

Hereinafter is a description of an electronic device according to various embodiments of the present disclosure with reference to the accompanying drawings. The term "user" may refer to a person using the electronic device, or a device (e.g., an artificial intelligence (AI) electronic device) using the electronic device.

FIG. 1 is a diagram illustrating a network environment according to various embodiments of the present disclosure.

Hereinafter is a description of an electronic device 101 in a network environment 100 according to various embodiments with reference to FIG. 1. Referring now to FIG. 1, the electronic device 101 may include at least one of a bus 110, a processor 120, a memory 130, an input/output (I/O) interface 150, a display 160, a communication interface 170, and a beacon data processing module 180. In some embodiments, the electronic device 101 may not include at least one of the above components or may further include other components.

The bus 110 may include, for example, a circuit for connecting the above components and transmitting communication information (e.g., control messages and/or data) between the above components.

The processor 120 may include at least one of a central processing unit (CPU), an application processor (AP), and a communication processor (CP). For example, the processor 120 may execute control of one or more other components of the electronic device 101 and/or data processing or operations related to communication.

The memory 130 may include a volatile memory and/or a nonvolatile memory. For example, the memory 130 may store data or commands related to one or more other components of the electronic device 101. According to an embodiment, the memory 130 may store software and/or a program 140. The program 140 may include, for example, a kernel 141, middleware 143, an application programming interface (API) 145, and/or an application program (or "application") 147. At least a portion of the kernel 141, the middleware 143, and the API 145 may be referred to as an operating system (OS).

For example, the kernel 141 may control or manage system resources (e.g., the bus 110, the processor 120, or the memory 130) used to execute operations or functions implemented other programs (e.g., the middleware 143, the API 145, or the application program 147). Also, the kernel 141 may provide an interface for controlling or managing the system resources when the middleware 143, the API 145, or the application program 147 accesses each component of the electronic device 101.

For example, the middleware 143 may perform a relay function so that the API 145 of the application program 147 may communicate data with the kernel 141. Also, for example, in relation to an operation request received from the application program 147, the middleware 143 may perform control (e.g., scheduling or load balancing) for the operation request by allocating at least one of the application program 147 the priority order for using the system resource (e.g., the bus 110, the processor 120, or the memory 130) of the electronic device 101.

For example, the API 145 may be an interface for the application 147 to control a function provided by the kernel 141 or the middleware 143, and may include at least one interface or function (e.g., instructions) for file control, window control, image processing, or character control.

For example, the I/O interface 150 may function as an interface for transmitting a command or data input from the user or another external device to one or more other components of the electronic device 101. Also, the I/O interface 150 may output a command or data received from one or more other components of the electronic device 101 to the user or another external device.

The display 160 may include, for example, a liquid crystal display (LCD), a light-emitting diode (LED) display, an organic light-emitting diode (OLED) display, a microelectromechanical system (MEMS) display, or an electronic paper display. For example, the display 160 may display various types of contents (e.g., texts, images, videos, icons, or symbols) to the user. For example, the display 160 may include a touchscreen and may receive a touch, gesture, proximity, or hovering input by using an electronic pen or a portion of the body of the user.

For example, the communication interface 170 may set the communication between the electronic device 101 and an external device (e.g., a beacon device 102, an external electronic device 104, or a server 106). For example, by wireless communication or wired communication, the communication interface 170 may be connected to a network 162 to communicate with the external device (e.g., the external electronic device 104 or the server 106).

The wireless communication may use, for example, at least one of long term evolution (LTE), long term evolution-advanced (LTE-A), code division multiple access (CDMA), wideband code division multiple access (WCDMA), universal mobile telecommunications system (UMTS), wireless broadband (WiBro), and global system for mobile communication (GSM) as cellular communication protocol. The wired communication may include, for example, at least one of universal serial bus (USB), high definition multimedia interface (HDMI), recommended standard 232 (RS-232), and plain old telephone service (POTS). The network 162 may include, for example, at least one of a telecommunications network, a computer network (e.g., local area network (LAN) or wide area network (WAN)), the Internet, and a telephone network. When detecting a data signal corresponding to an externally-received beacon, the beacon data processing module 180 may perform an operation related to the data signal.

Although FIG. 1 illustrates the beacon data processing module 180 as a separate module from the processor 120 in FIG. 1, at least a portion of the beacon data processing module 180 may be implemented in the processor 120 or at least one other module and all functions of the beacon data processing module 180 may be implemented in the processor 120 or other processors.

According to various embodiments of the present disclosure, the beacon data processing module 180 may decrypt the received beacon signal according to whether the received beacon includes beacon registration time information. Further detailed description of the beacon data processing module 180 is available with reference to FIG. 2.

Each of the beacon device 102 and the external electronic device 104 may be similar to or different in type from the electronic device 101.

The beacon device 102 may generate and broadcast a beacon signal.

Although the beacon device 102 generates and broadcasts a beacon device, the beacon device 102 may also generate and broadcast an advertisement packet according to various embodiments of the present disclosure.

According to an embodiment, the server 106 may include a group of one or more servers. According to various embodiments of the present disclosure, one or more other electronic devices (e.g., the beacon device 102 or the external electronic device 104) may execute all or some of the operations executed in the electronic device 101. According to an embodiment, when the electronic device 101 needs to perform a function or a service automatically or at the request, the electronic device 101 may request at least some function related thereto from other devices (e.g., the beacon device 102, the external electronic device 104, or the server 106) in addition to or instead of directly executing the function or the service. The other devices (e.g., the beacon device 102, the external electronic device 104, or the server 106) may execute the requested function or the additional function and transmit the execution results to the electronic device 101. The electronic device 101 may provide the requested function or service by processing the received execution results additionally or without change. For this purpose, for example, one may use cloud computing, distributed computing, or client-server computing technology.

Figure 2:
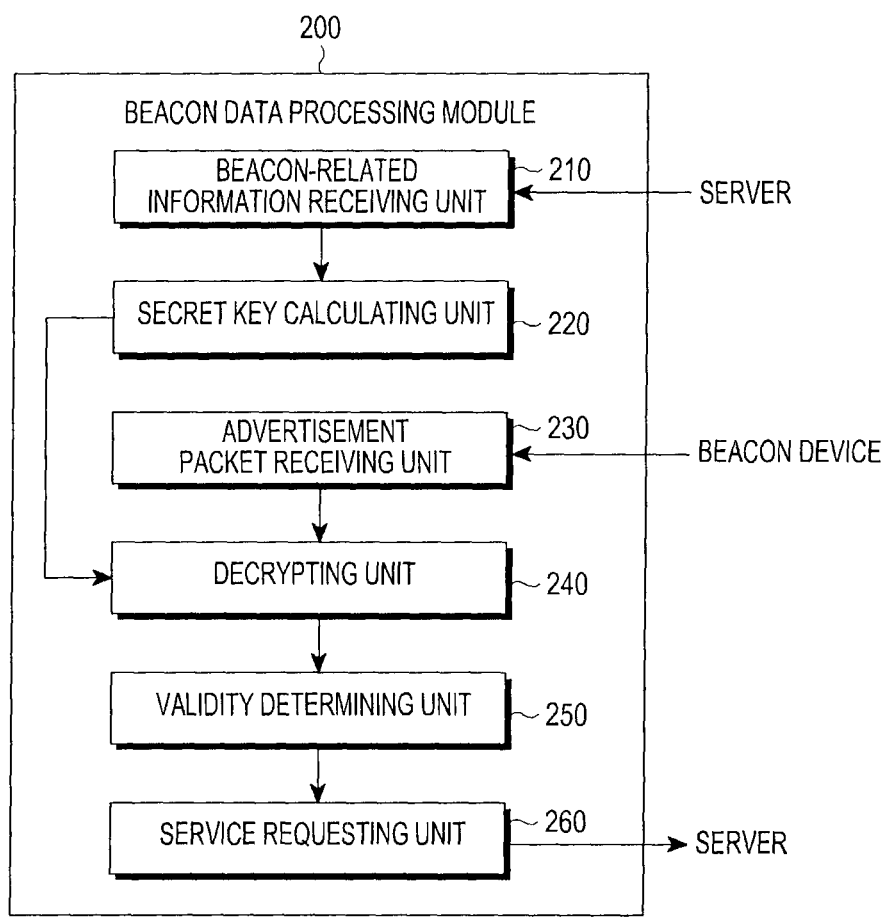
FIG. 2 is a block diagram illustrating a beacon data processing module configuration of an electronic device according to various embodiments of the present disclosure.

FIG. 2 is a block diagram illustrating a beacon data processing module configuration of an electronic device according to various embodiments of the present disclosure. Referring now to FIG. 2, a beacon data processing module 200 may include at least one of a beacon-related information receiving unit 210, a secret key calculating unit 220, an advertisement packet receiving unit 230, a validity determining unit 250, and a service requesting unit 260.

The beacon-related information receiving unit 210 may receive information related to beacon registration time (hereinafter referred to as beacon registration time-related information) from the server (e.g., the server 106).

According to various embodiments of the present disclosure, the beacon-related information receiving unit 210 may receive information related to beacon decryption (hereinafter also referred to as beacon decryption-related information). For example, the beacon decryption-related information may include a secret key according to an encryption mode set in common with the server (e.g., the server 106) or the beacon device (e.g., the beacon device 102). For example, the user or manufacturer may base encryption mode on a Hash function, and may prestore, in the memory (e.g., the memory 130), the secret key.

Also, the beacon decryption-related information may include identification information of the beacon device transmitting the corresponding beacon signal.

The secret key calculating unit 220 may calculate the secret key by using information about time elapsed from beacon registration time information (hereinafter also referred to as elapsed time information from beacon registration time information).

According to various embodiments of the present disclosure, the secret key calculating unit 220 may detect information about when the beacon device transmitting the beacon signal becomes registered (hereinafter also referred to as beacon registration time information), and calculate the secret key based on the beacon registration time information.

The advertisement packet receiving unit 230 may receive an advertisement packet from at least one external electronic device (e.g., the beacon device). For example, the advertisement packet may include beacon data, and a payload region of the advertisement packet may include a time stamp region and an encrypted data field region.

According to various embodiments of the present disclosure, the time stamp may include elapsed time information from the beacon registration time to the beacon signal transmission time.

According to various embodiments of the present disclosure, encryption of the encrypted data field region may be based on the elapsed time information from the beacon registration time to the beacon signal transmission time.

A decrypting unit 240 may decrypt the encrypted data field in the received advertisement packet by using the time stamp included in the received advertisement packet and the secret key information stored in the memory.

The validity determining unit 250 may determine the validity of the beacon data by comparing the elapsed time information from the beacon registration time information with the time information included in the beacon.

According to various embodiments of the present disclosure, the validity determining unit 250 may detect the difference between the elapsed time information from the beacon registration time to the current time (CS) and the time stamp value included in the beacon data and determine whether the detected difference value is a preset time range value or a preset time value. For example, the validity determining unit 250 may determine current time based on UNIX time. The validity determining unit 250 may determine whether the time stamp value included in the beacon data is valid based on the current time.

The service requesting unit 260 may request a beacon-related service from the server. For example, when the validity determining unit 250 determines that the elapsed time information from the beacon registration time is valid, the service requesting unit 260 may request the beacon-related service from the server (e.g., the server 106).

For example, the electronic device according to various embodiments of the present disclosure may include: a communication module configured to receive server registration time-related information that is information related to the time when at least one beacon device becomes registered in the server; and a processor configured to decrypt at least one beacon signal received from the at least one beacon device based on the received server registration time-related information.

According to various embodiments of the present disclosure, when receiving information for decrypting the beacon signal from the server, the processor may decrypt the beacon signal by further using the received information.

According to various embodiments of the present disclosure, the processor may calculate a secret key for decrypting the received beacon signal by using the elapsed time information from the received server registration time and decrypt the received beacon signal by using the calculated secret key.

According to various embodiments of the present disclosure, the processor may determine whether to request a service for the decrypted beacon from the server according to the result of the comparison between the elapsed time information from the received server registration time and the time information included in the beacon signal.

Figure 3:
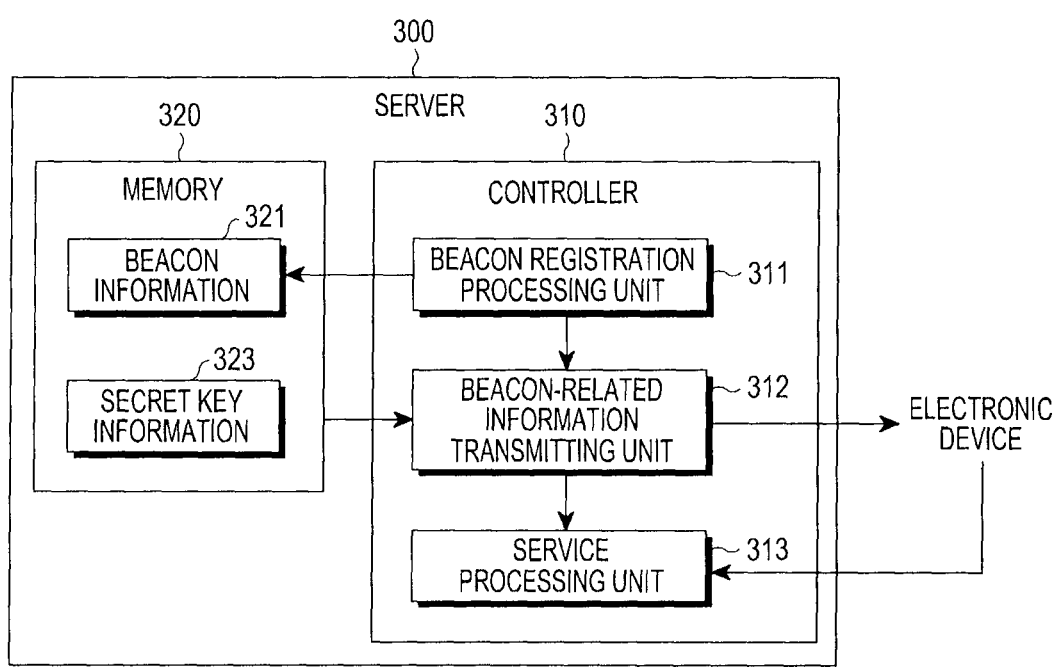
FIG. 3 is a block diagram illustrating a server device configuration according to various embodiments of the present disclosure.

FIG. 3 is a block diagram illustrating a server device configuration according to various embodiments of the present disclosure. Referring now to FIG. 3, a server 300 may include a controller 310 and a memory 320.

The controller 310 may include a beacon registration processing unit 311, a beacon-related information transmitting unit 312, or a service processing unit 313.

The beacon registration processing unit 311 may detect beacon registration time and store the detected beacon registration time in the memory 320.

The beacon-related information transmitting unit 312 may transmit the stored beacon registration time information or the secret key necessary for encrypting beacon data to at least one electronic device (e.g., the electronic device 101).

According to various embodiments of the present disclosure, when receiving the beacon registration time information or the secret key, the electronic device may determine the validity of the beacon corresponding to the broadcast beacon signal based on the received beacon registration time information and decrypt the encrypted beacon signal by using the secret key or the beacon registration time information.

When receiving the beacon information from at least one electronic device, the service processing unit 313 may provide a service corresponding to the received beacon information to the at least one electronic device.

For example, the server according to various embodiments of the present disclosure may include: a memory configured to store server registration time-related information that is information related to the time when at least one beacon device becomes registered in the server; and a controller configured to perform control to transmit the server registration time-related information to at least one electronic device and perform control to provide, in response to a request for a service related to a beacon signal, the requested beacon signal-related service to the electronic device requesting the service.

Figure 4:
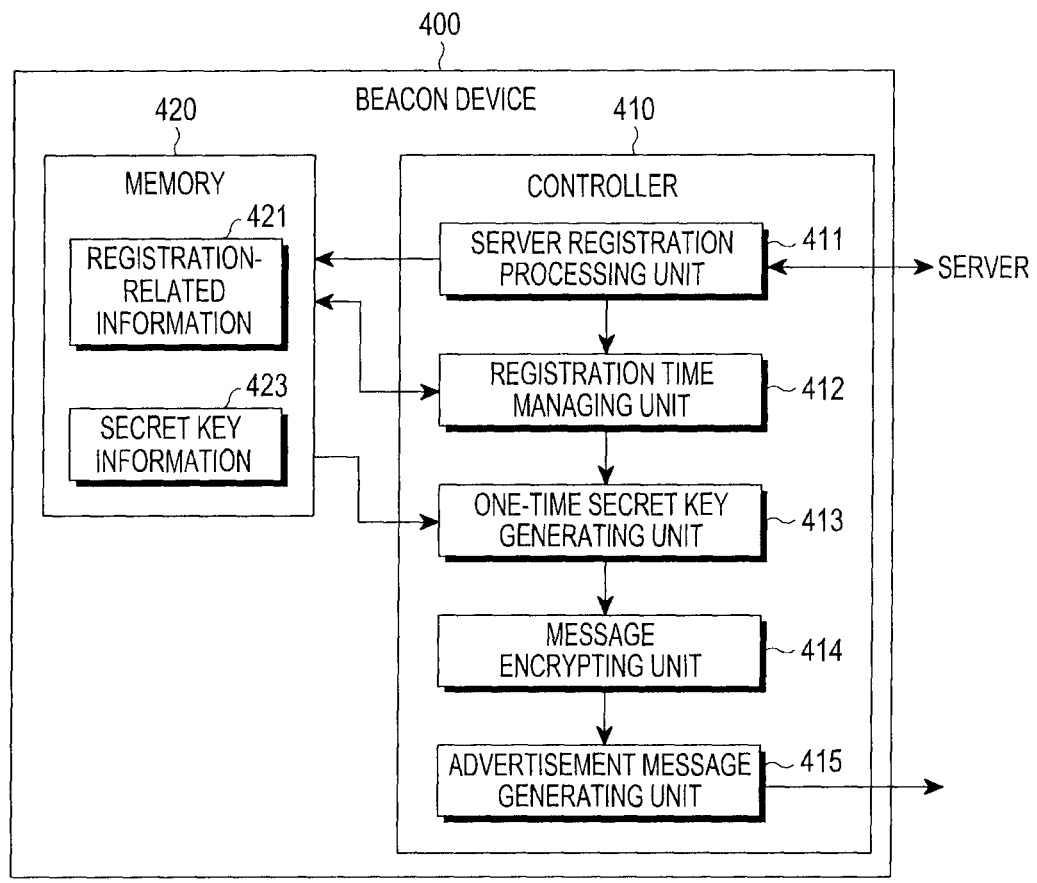
FIG. 4 is a block diagram illustrating a beacon device configuration according to various embodiments of the present disclosure.

FIG. 4 is a block diagram illustrating a beacon device configuration according to various embodiments of the present disclosure. Referring now to FIG. 4, a beacon device 400 may include a controller 410 and a memory 420.

The controller 410 may include at least one of a server registration processing unit 411, a registration time managing unit 412, a one-time secret key generating unit 413, a message encrypting unit 414, and an advertisement message generating unit 415.

The server registration processing unit 411 may register the beacon device 400 in the server (e.g., the server 106).

The registration time managing unit 412 may detect or store the time when the beacon device 400 becomes registered in the server (e.g., the server 106).

The one-time secret key generating unit 413 may detect the beacon device (400) registration time and generate a one-time secret key related to the elapsed time from the detected beacon device (400) registration time. For example, by using a predetermined encryption algorithm (e.g., an XOR operation), the one-time secret key generating unit 413 may generate a secret key with respect to beacon registration time and the unit time $TS_0$ (e.g., in units of seconds) elapsed from the beacon registration time.

A one-time secret key may be generated from various encryption algorithms according to various embodiments of the present disclosure.

Equation (1) below can calculate a one-time secret key K' according to various embodiments of the present disclosure.

$$K'=H(K\|TS_n) \qquad \text{Equation (1)}$$

In Equation (1), K denotes a secret key, $TS_0$ denotes the unit time elapsed from the beacon registration time, and H denotes a Hash function.

The message encrypting unit 414 may encrypt a message by using the secret key generated by the one-time secret key generating unit 413.

Equation (2) below is for encrypting a message by using the unit time elapsed from the beacon registration time according to various embodiments of the present disclosure.

$$ENC=E(M\|TS_1) \qquad \text{Equation (2)}$$

In Equation (2), ENC denotes an encrypted message, M denotes a message, $TS_1$ corresponds to $TS_0$, and E denotes a lightweight stream encryption algorithm (e.g., XOR).

The advertisement message generating unit 415 may include a field for each of 'time stamp' and 'Beacon ID' in a payload region in an advertisement packet. For example, the 'Beacon ID' field may include the encrypted beacon data encrypted by the message encrypting unit 414. For example, the 'time stamp' field may include the unit time information elapsed from the beacon registration time.

The advertisement message generated by the advertisement message generating unit 415 may be broadcast externally.

The memory 420 may store registration-related information 421 or secret key information 423.

The registration-related information 421 may include information about the time when the beacon device 400 becomes stored in the server.

The secret key information 423 may include secret key information that is previously received from the server to generate a one-time secret key.

For example, the beacon device according to various embodiments of the present disclosure may include: a memory configured to store information related to the registration time—that is, the time when the beacon device becomes registered in the server; and a controller configured to register the beacon device in the server, determine an elapsed time from the registration time—that is, the time when the beacon device becomes registered in the server, encrypt at least one piece of data in a beacon signal based on the elapsed time, and perform control to broadcast the beacon signal.

According to various embodiments of the present disclosure, the controller may generate a one-time secret key by using elapsed time information from the registration time and encrypt the at least one piece of data by using the one-time secret key.

According to various embodiments of the present disclosure, the controller may include the elapsed time information from the registration time in the beacon signal prior to broadcast.

According to various embodiments of the present disclosure, the controller may encrypt the at least one piece of data by using the one-time secret key and the encryption information received from the server or at least one electronic device.

Figure 5:
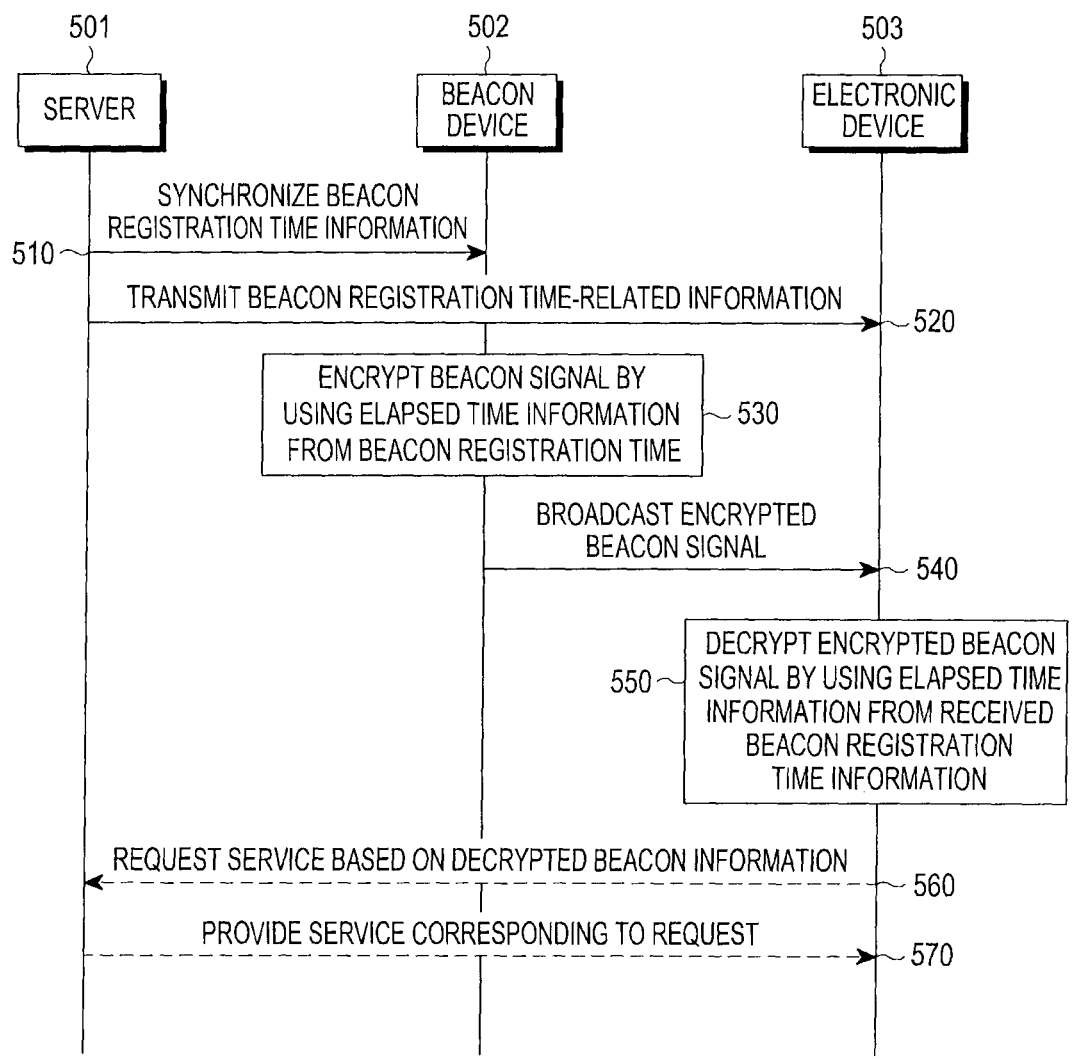
FIG. 5 is a flow diagram illustrating a data processing operation between a server, a beacon device, and an electronic device according to various embodiments of the present disclosure.

FIG. 5 is a flow diagram illustrating a data processing operation between a server, a beacon device, and an electronic device according to various embodiments of the present disclosure. Referring now to FIG. 5, in operation 510, beacon registration time information may be synchronized between a server 501 and a beacon device 502. For example, the server 501 and the beacon device 502 may detect information about the time when the beacon device 502 becomes registered in the server 501, as the beacon registration time information.

In operation 520, the server 501 may transmit beacon registration time-related information to an electronic device 503. Although FIG. 5 illustrates that the server 501 transmits beacon registration time information to the electronic device 503, the server 501 may transmit the beacon registration time information to any authorized electronic device so that it may detect the beacon signal generated by the beacon device 502. In operation 530, the beacon device 502 may encrypt at least one piece of data in the beacon signal by using elapsed time information from the beacon registration time.

According to various embodiments of the present disclosure, the beacon device 502 may share the encryption mode with the server 501 and thus receive the secret key from the server 501. For example, the beacon device 502 may encrypt the beacon data by using the received secret key.

In operation 540, the beacon device 502 may broadcast the encrypted beacon signal.

In operation 550, the electronic device 503 may decrypt the encrypted beacon signal by using the elapsed time information from the beacon registration time detected through the received beacon registration time information.

In operation 560, when the encrypted beacon signal becomes decrypted, the electronic device 502 may request a service from the server 501 based on the decrypted beacon information.

In operation 570, the server 501 may detect the beacon information corresponding to the service request and provide the electronic device 503 with the service related to the detected beacon information.

At least one of the operations illustrated in FIG. 5 may be omitted, or one or more other operations may be added between the above operations. Also, the claimed method may process the operations illustrated in FIG. 5 in the illustrated order, or the execution order may include at least one operation replacing at least one other operation.

Figure 6:
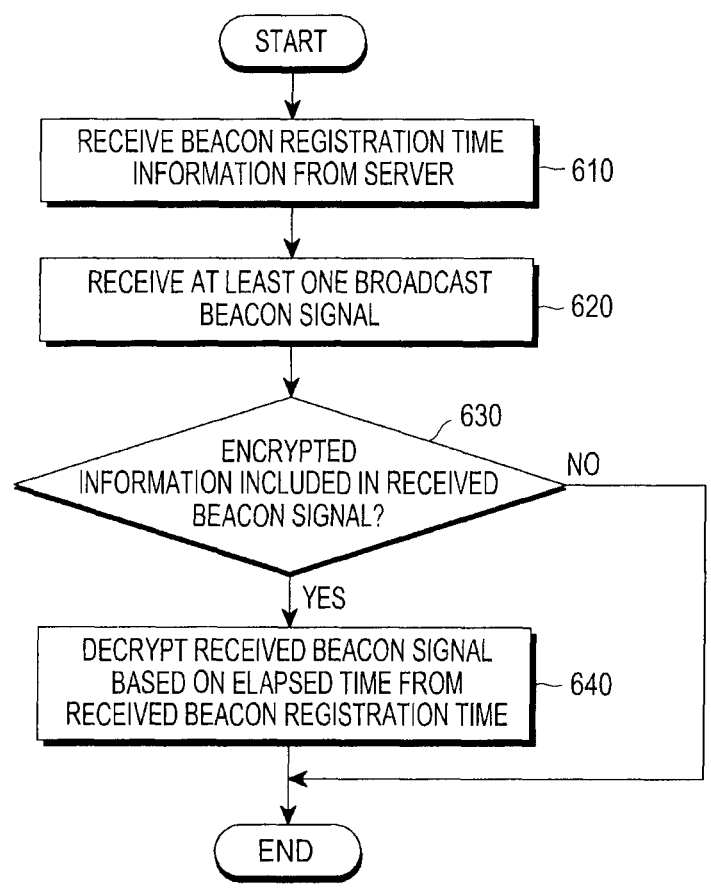
FIG. 6 is a flowchart illustrating a data processing operation in an electronic device according to various embodiments of the present disclosure.

FIG. 6 is a flowchart illustrating a data processing operation in an electronic device according to various embodiments of the present disclosure. Referring now to FIG. 6, in operation 610, the electronic device may receive the beacon registration time information from the server.

In operation 620, the electronic device may receive at least one broadcast beacon signal.

In operation 630, the electronic device may determine whether the received beacon signal includes encrypted information.

In operation 640, when the received beacon includes the beacon registration time-related information, the electronic device may decrypt the received beacon signal based on the elapsed time from the received beacon registration time.

At least one of the operations illustrated in FIG. 6 may be omitted, or one or more other operations may be added between the above operations. Also, the claimed method may process the operations illustrated in FIG. 6 in the illustrated order, or the execution order may include at least one operation replacing at least one other operation.

For example, a method for processing data in the electronic device according to various embodiments of the present disclosure may include: receiving server registration time-related information that is information related to the time when at least one beacon device becomes registered in the server; and decrypting at least one beacon signal received from the at least one beacon device based on the received server registration time-related information.

The method for processing data in the electronic device according to various embodiments of the present disclosure may further include: receiving information for decrypting the beacon signal from the server; and decrypting the beacon signal by using the received information.

The method for processing data in the electronic device according to various embodiments of the present disclosure may further include: calculating a secret key for decrypting the received beacon signal by using elapsed time information from the received server registration time; and decrypting the received beacon signal by using the calculated secret key.

The method for processing data in the electronic device according to various embodiments of the present disclosure may further include determining whether to request a service for the decrypted beacon from the server according to the result of the comparison between the elapsed time information from the received server registration time and the time information included in the beacon signal.

Figure 7:
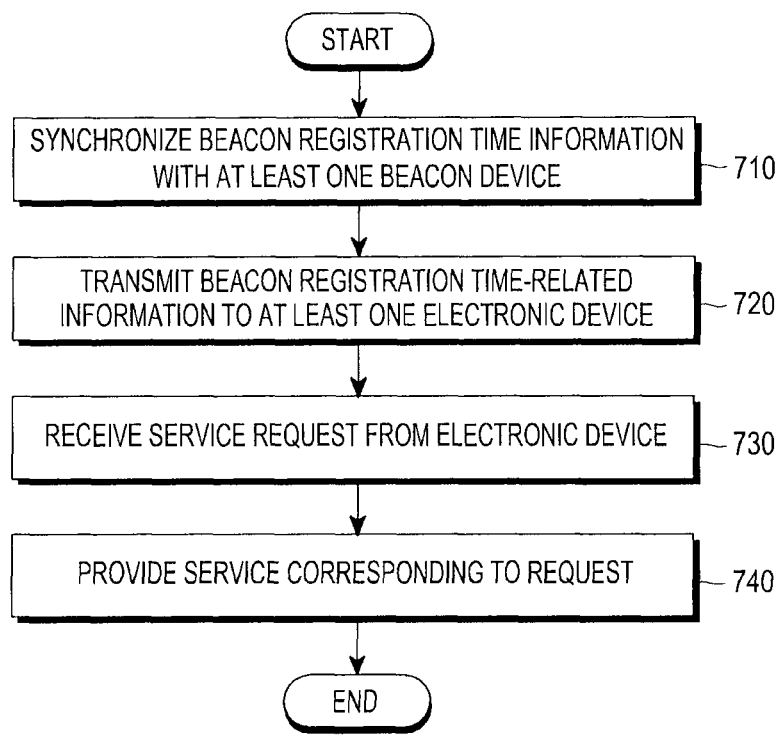
FIG. 7 is a flowchart illustrating a data processing operation in a server according to various embodiments of the present disclosure.

FIG. 7 is a flowchart illustrating a data processing operation in a server according to various embodiments of the present disclosure. Referring now to FIG. 7, in operation 710, the server may synchronize the beacon registration time information with at least one beacon device. For example, the synchronization operation of the server may include an operation of determining the time when the beacon device becomes registered in the server, as the beacon registration time information.

In operation 720, the server may transmit the beacon registration time information to at least one electronic device.

In operation 730, the server may receive a service request from at least one electronic device.

According to various embodiments of the present disclosure, the service request triggers a request from the electronic device for a service for the encrypted beacon when at least one piece of data in the beacon signal is encrypted based on the beacon registration time information.

In operation 740, the server may provide the service corresponding to the request to the at least one electronic device.

At least one of the operations illustrated in FIG. 7 may be omitted, or one or more other operations may be added between the above operations. Also, the claimed method may process the operations illustrated in FIG. 7 in the illustrated order, or the execution order may include at least one operation replacing at least one other operation.

For example, a method for processing data in the server according to various embodiments of the present disclosure may include: determining server registration time-related information—that is, information related to the time when at least one beacon device becomes registered in the server; transmitting the server registration time-related information to at least one electronic device; and providing, in response to a request for a service related to a beacon signal, the requested beacon signal-related service to the electronic device requesting the service.

Figure 8:
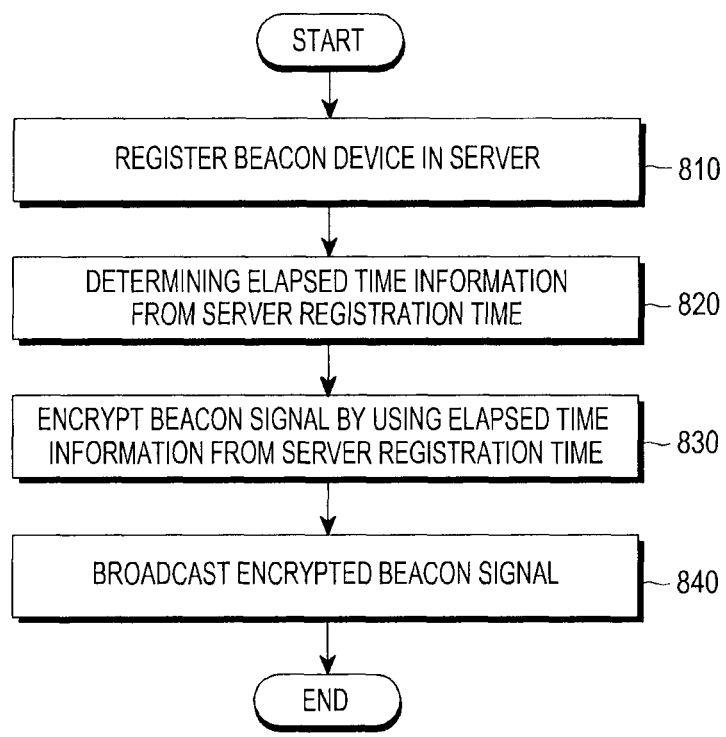
FIG. 8 is a flowchart illustrating a data processing operation in a beacon device according to various embodiments of the present disclosure.

FIG. 8 is a flowchart illustrating a data processing operation in a beacon device according to various embodiments of the present disclosure. Referring now to FIG. 8, in operation 810, the beacon device may register the beacon device in the server.

In operation 820, the beacon device may determine elapsed time information from the server registration time.

In operation 830, the beacon device may encrypt the beacon signal by using the elapsed time information from the server registration time.

According to various embodiments of the present disclosure, the beacon device may generate a one-time secret key by using the elapsed time difference value from the beacon registration time to the beacon signal broadcast time. For example, the beacon device may encrypt the beacon signal by using the one-time secret key.

In operation 840, the beacon device may broadcast the encrypted beacon signal.

According to various embodiments of the present disclosure, the beacon device may broadcast beacon data further including the elapsed time information from the beacon registration time in the encrypted beacon. For example, when receiving the beacon data, the electronic device may determine validity of the beacon data by using the elapsed time information from the beacon registration time.

At least one of the operations illustrated in FIG. 8 may be omitted, or one or more other operations may be added between the above operations. Also, the claimed method may process the operations illustrated in FIG. 8 in the illustrated order, or the execution order may include at least one operation replacing at least one other operation.

For example, a method for processing data in the beacon device according to various embodiments of the present disclosure may include: registering the beacon device in the server; determining an elapsed time from a registration time that is the time when the beacon device becomes registered in the server; encrypting at least one piece of data in a beacon signal based on the elapsed time; and broadcasting the beacon signal.

The method for processing data in the beacon device according to various embodiments of the present disclosure may further include: generating a one-time secret key by using the elapsed time information from the registration time; and encrypting the at least one piece of data by using the one-time secret key.

The method for processing data in the beacon device according to various embodiments of the present disclosure may further include using elapsed time information from the registration time in the beacon signal.

The method for processing data in the beacon device according to various embodiments of the present disclosure may further include encrypting the at least one piece of data by using the one-time secret key and the encryption information received from the server or at least one electronic device.

Figure 9:
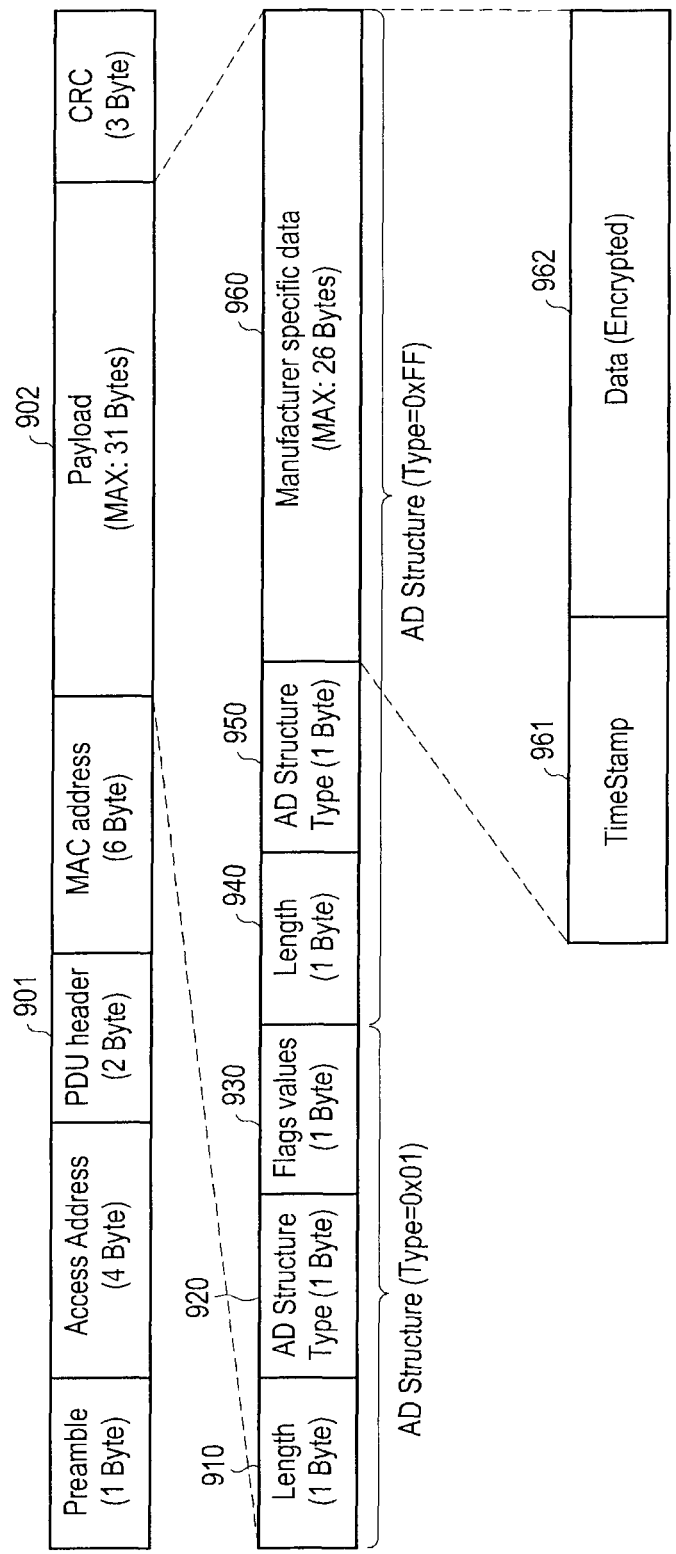
FIG. 9 is a diagram illustrating a packet structure according to various embodiments of the present disclosure.

FIG. 9 is a diagram illustrating a packet structure according to various embodiments of the present disclosure. Referring now to FIG. 9, a packet may include a field for each of 'Preamble', 'Access Address', 'PDU header' (901), 'MAC address', 'Payload' (902), and 'CRC'.

The 'Preamble' field may include information such as packet capacity information or device type information.

The 'Access Address' may include network address information.

The 'PDU header' (901) field may include information about 'Payload' (902), such as manufacturer information, electronic device type information, packet type information, or information indicating the data included in the packet.

The 'MAC address' field may include unique identification information of the electronic device.

The 'Payload' (902) field may include a field for each of 'Length' (910 or 940), 'AD Structure Type' (920 or 950), 'Flags values' (930), and 'Manufacturer specific data' (960).

The 'Length' (910 or 940) field may include length information of 'Payload' (902).

The 'AD Structure Type' (920 or 950) field may include advertisement packet structure information.

The 'Flags values' (930) field may include flag information.

The 'Manufacturer specific data' (960) field may include information set by the manufacturer. According to various embodiments of the present disclosure, the 'Manufacturer specific data' (960) field may include information about each of 'Time Stamp' (961) and 'Data (Encrypted)' (962).

The 'Time stamp' (961) field may include elapsed time information from the server registration time of the beacon device to the current time detected by the beacon device.

According to various embodiments of the present disclosure, the elapsed time information from the server registration time to the current time included in the 'Time stamp' (961) field may be used to determine the validity of the packet.

The 'Data (Encrypted)' (962) field may include identification information of the beacon data, such as location information of the beacon device.

According to various embodiments of the present disclosure, the 'Data (Encrypted)' (962) field may be encrypted with the one-time secret key generated by using the beacon registration time information of the beacon device.

Figure 10:
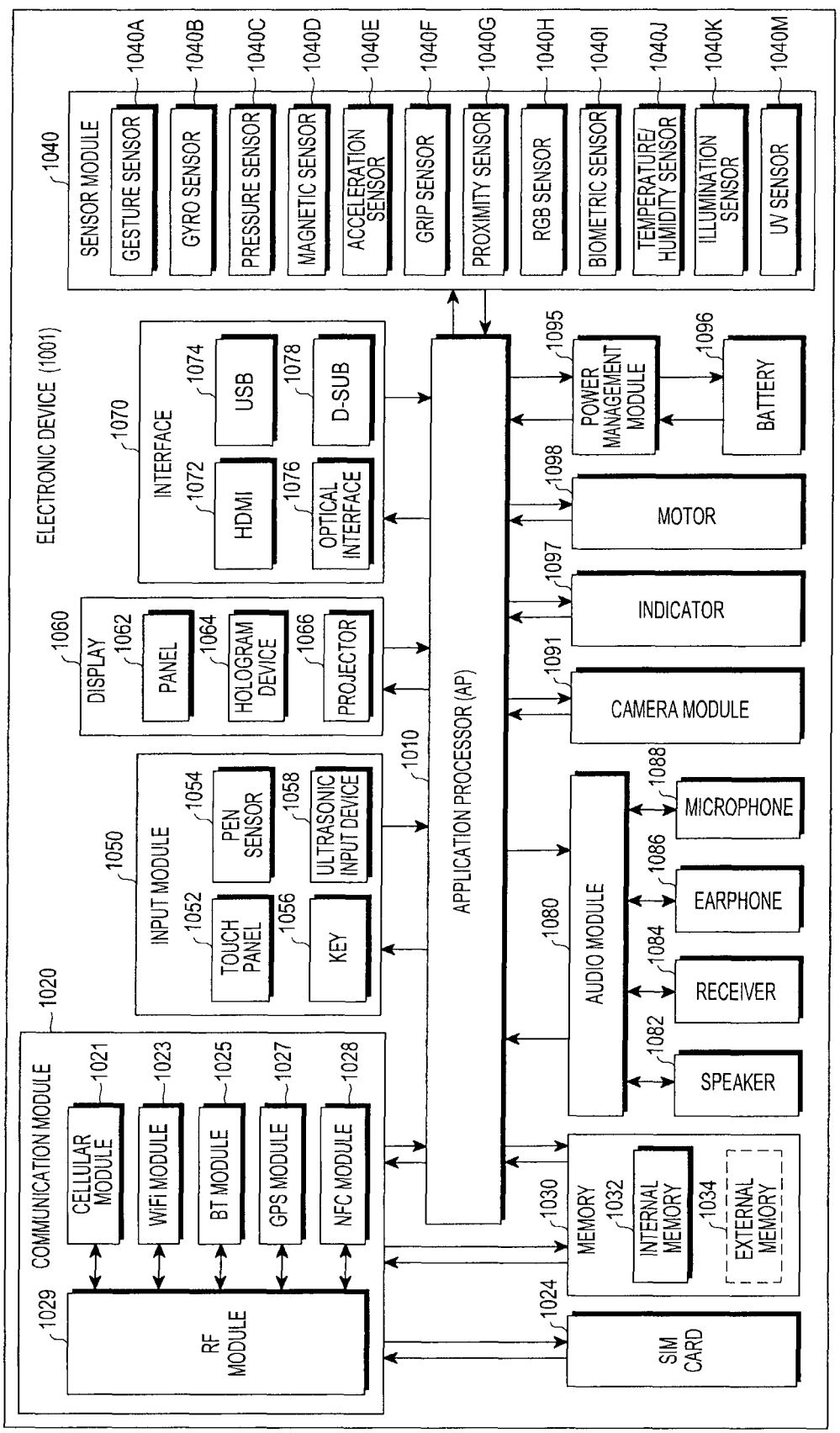
FIG. 10 is a block diagram illustrating an electronic device configuration according to various embodiments of the present disclosure.

FIG. 10 is a block diagram illustrating an electronic device configuration according to various embodiments of the present disclosure. Referring now to FIG. 10, an electronic device 1001 may include, for example, all or some of the electronic device 101 illustrated in FIG. 1. The electronic device 1001 may include at least one processor (e.g., application processor (AP)) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

For example, by driving an operating system (OS) or an application program, the AP 1010 may control a plurality of hardware or software components connected to the AP 1010 and perform various data processings and operations. The AP 1010 may be implemented, for example, as a system on chip (SoC). According to an embodiment, the AP 1010 may include a graphic processing unit (GPU) and/or an image signal processor (ISP). The AP 1010 may include at least some (e.g., cellular module 1021) of the components illustrated in FIG. 10. The AP 1010 may load a command or data received from at least one of other components (e.g., a nonvolatile memory) into a volatile memory and process the loaded data, and the AP 1010 may store various data in the nonvolatile memory.

The communication module 1020 may have an identical or similar configuration to the communication interface 170 of FIG. 1. The communication module 1020 may include, for example, a cellular module 1021, a wireless fidelity (WiFi) module 1023, a Bluetooth (BT) module 1025, a GPS module 1027, a near field communication (NFC) module 1028, and a radio frequency (RF) module 1029.

The cellular module 1021 may provide, for example, a voice call service, a video call service, a text message service, or an Internet service through a communication network. According to an embodiment, the cellular module 1021 may identify and authenticate the electronic device 1001 in the communication network by using a subscriber identification module (e.g., the SIM card 1024). According to an embodiment, the cellular module 1021 may perform at least some of the functions that may be provided by the AP 1010. According to an embodiment, the cellular module 1021 may include a communication processor (CP).

Each of the WiFi module 1023, the BT module 1025, the GPS module 1027, and the NFC module 1028 may include, for example, a processor for processing data transmitted/received through the corresponding module. According to some embodiments, at least some (e.g., two or more) of the cellular module 1021, the WiFi module 1023, the BT module 1025, the GPS module 1027, and the NFC module 1028 may be included in an integrated chip (IC) or an IC package.

The RF module 1029 may transmit/receive, for example, a communication signal (e.g., an RF signal). The RF module 1029 may include, for example, a transceiver, a power amplifier module (PAM), a low noise amplifier (LNA), or an antenna. According to another embodiment, at least one of the cellular module 1021, the WiFi module 1023, the BT module 1025, the GPS module 1027, and the NFC module 1028 may transmit/receive an RF signal through a separate RF module.

The SIM card 1024 may include an embedded SIM and/or a card including an SIM, and may include unique identification information (e.g., integrated circuit card identifier (ICCID)) or subscriber information (e.g., international mobile subscriber identity (IMSI)).

The memory 1030 (e.g., the memory 130) may include, for example, an internal memory 1032 or an external memory 1034. The internal memory 1032 may include, for example, at least one of a volatile memory (e.g., a dynamic RAM (DRAM), a static RAM (SRAM), or a synchronous dynamic RAM (SDRAM)) and a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard drive, or a solid state drive (SSD)).

The external memory 1034 may include, for example, a flash drive such as compact flash (CF), secure digital (SD), micro secure digital (Micro-SD), mini secure digital (Mini-SD), extreme digital (xD), or memory stick. Various interfaces may operatively and/or physically connect the external memory 1034 to the electronic device 1001.

For example, the sensor module 1040 may measure a physical quantity or sense an operation state of the electronic device 1001 and convert the measured or sensed information into an electrical signal. The sensor module 1040 may include, for example, at least one of a gesture sensor 1040A, a gyro sensor 1040B, a pressure sensor 1040C, a magnetic sensor 1040D, an acceleration sensor 1040E, a grip sensor 1040F, a proximity sensor 1040G, a color sensor (e.g., an RGB (Red, Green, Blue) sensor 1040H), a biometric sensor 1040I, a temperature/humidity sensor 1040J, an illumination sensor 1040K, and an ultraviolet sensor 1040M. Additionally or alternatively, the sensor module 1040 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling one or more of the sensors included therein. In some embodiments, the electronic device 1001 may further include a processor, which is configured separately or as a portion of the AP 1010 to control the sensor module 1040, to control the sensor module 1040 while the AP 1010 is in a sleep state.

The input device 1050 may include, for example, a touch panel 1052, a (digital) pen sensor 1054, a key 1056, or an ultrasonic input device 1058. The touch panel 1052 may be, for example, at least one of a capacitive type, a resistive type, an infrared type, and an ultrasonic type. Also, the touch panel 1052 may further include a control circuit. The touch panel 1052 may further include a tactile layer to provide a haptic reaction to a user.

In an embodiment, the (digital) pen sensor 1054 may be a portion of the touch panel or may include a separate recognition sheet. The key 1056 may include, for example, a physical key, an optical key, or a keypad. The ultrasonic input device 1058 may include an input unit generating an ultrasonic signal so that the electronic device 1001 may detect data by sensing a sound wave through a microphone (e.g., a microphone 1088).

The display 1060 (e.g., the display 160) may include a panel 1062, a hologram device 1064, or a projector 1066. The panel 1062 may include an identical or similar configuration to the display 160 of FIG. 1. For example, the panel 1062 may be implemented to be flexible, transparent, or wearable. The panel 1062 may be integrated with the touch panel 1052 into one module. The hologram device 1064 may display a stereoscopic image in the air by using light interference. The projector 1066 may display an image by projecting light onto a screen. For example, the screen may be located inside or outside the electronic device 1001. According to an embodiment, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature (D-sub) 1078. In an embodiment, the communication interface 170 illustrated in FIG. 1 may include the interface 1070. Additionally, or alternatively, the interface 1070 may include, for example, a mobile high-definition link (MHL) interface, a secure digital (SD) card/multimedia card (MMC) interface, or an infrared data association (IrDA) standard interface.

For example, the audio module 1080 may convert a sound into an electrical signal and an electrical signal into a sound. For example, the I/O interface 150 illustrated in FIG. 1 may include at least some components of the audio module 1080. For example, the audio module 1080 may process sound information that is input or output through a speaker 1082, a receiver 1084, an earphone 1086, or a microphone 1088.

For example, the camera module 1091 may capture a still image and a moving image. According to an embodiment, the camera module 1091 may include one or more image sensors (e.g., a front sensor or a rear sensor), a lens, an image signal processor (ISP), or a flash (e.g., an LED or a xenon lamp).

For example, the power management module 1095 may manage the power of the electronic device 1001. According to an embodiment, the power management module 1095 may include a power management integrated circuit (PMIC), a charger integrated circuit (IC), or a battery gauge or fuel gauge. The PMIC may have a wired or wireless charge mode. The wireless charge mode may include a magnetic resonance mode, a magnetic induction mode, or an electromagnetic wave mode and may further include an additional wireless charge circuit such as a coil loop, a resonant circuit, or a rectifier. The battery gauge may measure the residual capacity, charge voltage, current, or temperature of the battery 1096. The battery 1096 may include, for example, a rechargeable battery and/or a solar battery.

The indicator 1097 may indicate a particular state of the electronic device 1001 or a portion thereof (e.g., the AP 1010), such as a booting state, a message state, or a charge state. The motor 1098 may convert an electrical signal into a mechanical vibration and may generate a vibration or a haptic effect. Although not illustrated, the electronic device 1001 may include a processing device (e.g., a GPU) for supporting a mobile TV. For example, the processing device for supporting a mobile TV may process media data according to the standards such as digital multimedia broadcasting (DMB), digital video broadcasting (DVB), or MediaFLO.

Each of the above-described components of the electronic device may include at least one component, and the name of each component may vary according to the type of the electronic device. In various embodiments of the present disclosure, the electronic device may include at least one of the above-described components, and some components may be omitted from the electronic device or additional other components may be further included in the electronic device. Also, some of the components of the electronic device according to various embodiments of the present disclosure may be combined into one entity to perform the same functions as the corresponding components prior to combination.

Figure 11:
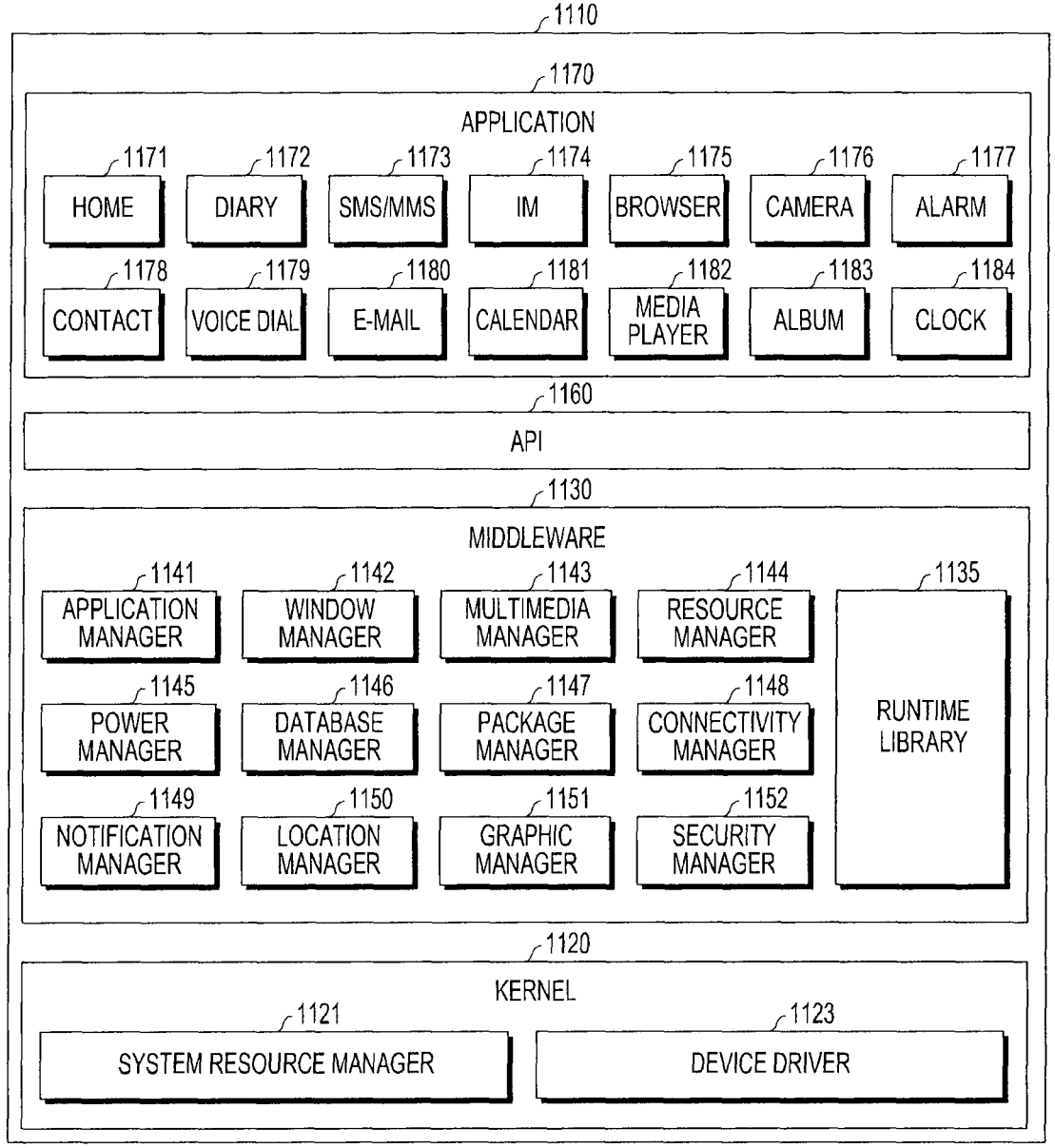
FIG. 11 is a block diagram illustrating a program module configuration according to various embodiments of the present disclosure.

FIG. 11 is a block diagram illustrating a program module configuration according to various embodiments of the present disclosure. Referring now to FIG. 11, according to an embodiment, a program module 1110 (e.g., the program 140) may include an operating system (OS) for controlling the resources related to the electronic device (e.g., the electronic device 101), and/or various applications (e.g., the application program 147) driven on the OS. The OS may include, for example, Android™, iOS™ Windows™, Symbian™, Tizen™, or Bada™.

The program module 1110 may include a kernel 1120, middleware 1130, an application programming interface (API) 1160, and/or an application 1170. At least a portion of the program module 1110 may be preloaded on the electronic device or may be downloaded from the server (e.g., the server 106).

The kernel 1120 (e.g., the kernel 141 of FIG. 1) may include, for example, a system resource manager 1121 or a device driver 1123. The system resource manager 1121 may control, allocate, or recover the system resources. According to an embodiment, the system resource manager 1121 may include a process managing unit, a memory managing unit, or a file system managing unit. The device driver 1123 may include, for example, a display driver, a camera driver, a Bluetooth driver, a shared memory driver, a USB driver, a keypad driver, a WiFi driver, an audio driver, or an interprocess communication (IPC) driver.

For example, the middleware 1130 may provide a common function for the application 1170, or may provide various functions to the application 1170 through the API 1160 so that the application 1170 may efficiently use the limited system resources in the electronic device. According to an embodiment, the middleware 1130 (e.g., the middleware 143) may include at least one of a runtime library 1135, an application manager 1141, a window manager 1142, a multimedia manager 1143, a resource manager 1144, a power manager 1145, a database (DB) manager 1146, a package manager 1147, a connectivity manager 1148, a notification manager 1149, a location manager 1150, a graphic manager 1151, and a security manager 1152.

The runtime library 1135 may include, for example, a library module that a compiler may use to add a new function through a programming language while executing the application 1170. The runtime library 1135 may perform I/O management, memory management, or arithmetical functions.

For example, the application manager 1141 may manage the life cycle of at least one of the application 1170. The window manager 1142 may manage GUI resources used in the screen. The multimedia manager 1143 may detect a format which is necessary to play various media files and perform encoding or decoding on a media file by using a codec according to the detected format. The resource manager 1144 may manage the resource of a memory or a storage space and the source code of at least one of the application 1170.

For example, by operating together with a basic input/output system (BIOS), the power manager 1145 may manage the battery or the power supply and power information necessary for the operation of the electronic device. The DB manager 1146 may generate, search, or modify a DB which at least one of the application 1170 may use. The package manager 1147 may manage the update or installation of an application that is distributed in the form of a package file.

For example, the connectivity manager 1148 may manage wireless connection such as WiFi or Bluetooth. The notification manager 1149 may display or notify an event such as message arrival, engagement, or proximity alarm to the user in an undisturbed manner. The location manager 1150 may manage location information of the electronic device. The graphic manager 1151 may manage a graphic effect to be provided to the user, or a user interface (UI) related thereto. The security manager 1152 may provide various security functions necessary for user authentication or system security. According to an embodiment, when an electronic device (e.g., the electronic device 101) includes a phone function, the middleware 1130 may further include a telephony manager for managing a voice or video call function of the electronic device.

The middleware 1130 may include a middleware module for providing a combination of the various functions of the above-described components. The middleware 1130 may provide a specialized module for each OS type in order to provide a specialized function. Also, the middleware 1130 may dynamically delete some of the existing components or add new components.

According to an embodiment, as a set of API programming functions, the API 1160 (e.g., the API 145) may have different configurations according to the OS types. For example, Android™ or iOS™ may provide one API set for each platform, and Tizen™ may provide two API sets for each platform.

According to an embodiment, the application 1170 (e.g., the application program 147) may include one or more applications that may provide one or more functions such as a home 1171, a dialer 1172, a short message service/multimedia messaging service (SMS/MMS) 1173, an instant message (IM) 1174, a browser 1175, a camera 1176, an alarm 1177, a contact 1178, a voice dial 1179, an e-mail 1180, a calendar 1181, a media player 1182, an album 1183, a watch 1184, healthcare (e.g., exercise amount or blood sugar measurement), or provision of environment information (e.g., pressure, humidity, or temperature information).

According to an embodiment, the application 1170 may include an application (hereinafter referred to as "information communication application") for supporting information communication between the electronic device (e.g., the electronic device 101) and the external electronic device (e.g., the beacon device 102 or the electronic device 104). The information communication application may include, for example, a notification relay application for transmitting particular information to the external electronic device, or a device management application for managing the external electronic device.

For example, the notification relay application may include a function for transmitting notification information, which is generated by other applications of the electronic device (e.g., an SMS/MMS application, an e-mail application, a healthcare application, or an environment information application), to the external electronic device (e.g., the beacon device 102 or the electronic device 104). Also, for example, the notification relay application may receive notification information from the external electronic device and provide the received notification information to the user. For example, the device management application may manage at least one function (e.g., turn-on/off of the external electronic device (or some components thereof) or control of the display brightness (or resolution)) of the external electronic device (e.g., the electronic device 104) communicating with the electronic device, or a service (e.g., a call service or a message service) provided by the external electronic device or the application operating in the external electronic device.

According to an embodiment, the application 1170 may include an application (e.g., a healthcare application) designated according to the attribute (the mobile medical device as the electronic device type) of the external electronic device (e.g., the beacon device 102 or the electronic device 104). According to an embodiment, the application 1170 may include an application received from the external electronic device (e.g., the server 102, the beacon device 102, or the electronic device 104). According to an embodiment, the application 1170 may include a preloaded application or a third party application that may be downloaded from the server. According to illustrated components, names of the components of the program module 1110 may vary according to the OS types.

According to various embodiments of the present disclosure, at least a portion of the program module 1110 may be implemented in software, firmware, hardware, or any combination thereof. For example, the processor (e.g., the AP 1010) may implement (e.g., execute) at least a portion of the program module 1110. According to an embodiment, at least a portion of the program module 1110 may include a module, a program routine, an instruction set, or a process for performing one or more functions.

The term "module" used herein may refer to, for example, a unit including hardware, software, firmware, or any combination thereof. For example, the term "module" may be interchangeably used with terms such as "unit," "logic,", "logical block," "component," or "circuit". The "module" may be a portion or a minimum unit of an integrated component. The "module" may be a portion or a minimum unit for performing one or more functions. The "module" may be implemented mechanically or electronically. For example, the "module" may include at least one of an application-specific integrated circuit (ASIC) chip, a field-programmable gate array (FPGA), or a programmable-logic device for performing some operations, which are known or to be developed.

For example, at least a portion of the device (e.g., modules or functions thereof) or method (e.g., operations) according to various embodiments of the present disclosure may be implemented in the form of a program module by instructions stored in computer-readable storage media. When the processor (e.g., the processor 120) executes the instructions, the at least one processor may perform a function corresponding to the instructions. The computer-readable storage media may include, for example, the memory 130.

The computer-readable storage media may include hard disks, floppy disks, magnetic media (e.g., magnetic tapes), optical media (e.g., compact disc read only memory (CD-ROM), digital versatile disk (DVD), or magneto-optical media (e.g., floptical disks)), hardware devices (e.g., read only memory (ROM) or random access memory (RAM), or flash memories). Also, the program commands may include machine language codes that may be generated by a compiler, and high-level language codes that a computer, via an interpreter, may execute. The aforementioned hardware devices may be configured to operate as one or more software modules to perform the operations of the various embodiments of the present disclosure, and vice versa.

The module or the program module according to various embodiments of the present disclosure may include at least one of the above-described components, and some components may be omitted therefrom or additional other components may be further included therein. The operations performed by the module, program module, or other components according to various embodiments of the present disclosure may be executed by sequential, parallel, iterative, or heuristic modes. Also, some operations may be executed in different order or omitted, or other operations may be additionally executed.

The embodiments listed herein describe, as opposed to limit, the disclosure. Therefore, the scope of the present disclosure includes all modifications or various other embodiments based on the technical concept of the present disclosure.

According to the various embodiments of the present disclosure, the electronic device and the method for processing data in the electronic device may increase the security of an advertisement packet by encrypting the advertisement packet such that only electronic devices of the corresponding manufacturer may detect the advertisement packet. The advertisement packet may avoid detection or retransmission by any unauthorized electronic device.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

While the disclosure is with reference to certain embodiments thereof, those skilled in the art will understand that various changes in form and details may be made therein without departing from the spirit and scope of the disclosure as defined by the appended claims and their equivalents.

What is claimed is:

1. A method for processing data in a beacon device, the method comprising:
   registering the beacon device in a server;
   determining an elapsed time from a registration time that indicates information related to a time when the beacon device becomes registered in the server;
   generating a secret key using the elapsed time;
   encrypting at least part of data in a beacon signal using the secret key; and
   broadcasting the beacon signal to an electronic device, wherein the electronic device is configured to:
      receive the registration time from the server,
      in response to receiving the beacon signal from the beacon device, decrypt the beacon signal using the secret key calculated based on the received registration time; and
      transmit a message to request a service related to the decrypted beacon signal to the server, in response to determining that the decrypted beacon signal is valid based on a determination of time information included in the decrypted beacon signal.

2. The method of claim 1, wherein the time information included in the decrypted beacon signal corresponds to the elapsed time.

3. A method for processing data in a server, the method comprising:
   determining server registration time-related information that indicates information related to a time when at least one beacon device becomes registered in the server;
   transmitting the server registration time-related information to an electronic device;
   receiving a request for a service related to a beacon signal from the electronic device; and
   transmitting the requested beacon signal-related service to the electronic device;
   wherein the beacon signal is encrypted in the at least one beacon device and decrypted in the electronic device, based on a secret key determined using the server registration time-related information, and
   wherein the electronic device transmits the request for the service related to the at least one decrypted beacon signal to the server, in response to determining that the beacon signal is valid based on an elapsed time from the server registration time-related information included in the beacon signal.

4. A beacon device comprising:
   a memory configured to store information related to a registration time indicating information related to a time when the beacon device becomes registered in a server; and
   a controller configured to:
      register the beacon device in a server;
      determine an elapsed time from a registration time that indicates information related to a time when the beacon device becomes registered in the server;
      generating a secret key using the elapsed time;
      encrypt at least part of data in a beacon signal using the secret key; and
      broadcast the beacon signal to an electronic device;
      wherein the electronic device is configured to receive the registration time from the server, in response to receiving the beacon signal from the beacon device, decrypt the beacon signal using the secret key calculated based on the received registration time and transmit a message to request a service related to the decrypted beacon signal to the server, in response to determining that the decrypted beacon signal is valid based on a determination of time information included in the decrypted beacon signal.

5. The beacon device of claim 4, wherein the time information included in the decrypted beacon signal corresponds to the elapsed time.

6. A server comprising:
   a memory configured to store server registration time-related information that indicates information related to a time when at least one beacon device becomes registered in the server; and
   a controller configured to:
      transmit the server registration time-related information to an electronic device;
      receive a request for a service related to a beacon signal from the electronic device; and
      transmit the requested beacon signal-related service to the electronic device;
      wherein the beacon signal is encrypted in the at least one beacon device and decrypted in the electronic device, using a secret key determined based on the server registration time-related information, and
      wherein the electronic device transmits the request for the service related to the at least one decrypted beacon signal to the server, in response to determining that the beacon signal is valid based on an elapsed time from the server registration time-related information included in the beacon signal.

* * * * *